Dec. 11, 1945. N. R. KRAUSE ET AL 2,390,949

FEEDING MECHANISM

Filed April 28, 1942 2 Sheets-Sheet 1

INVENTORS
Norman R. Krause
Sherman C. Heth
BY Emerson B. Donnell
ATTORNEY

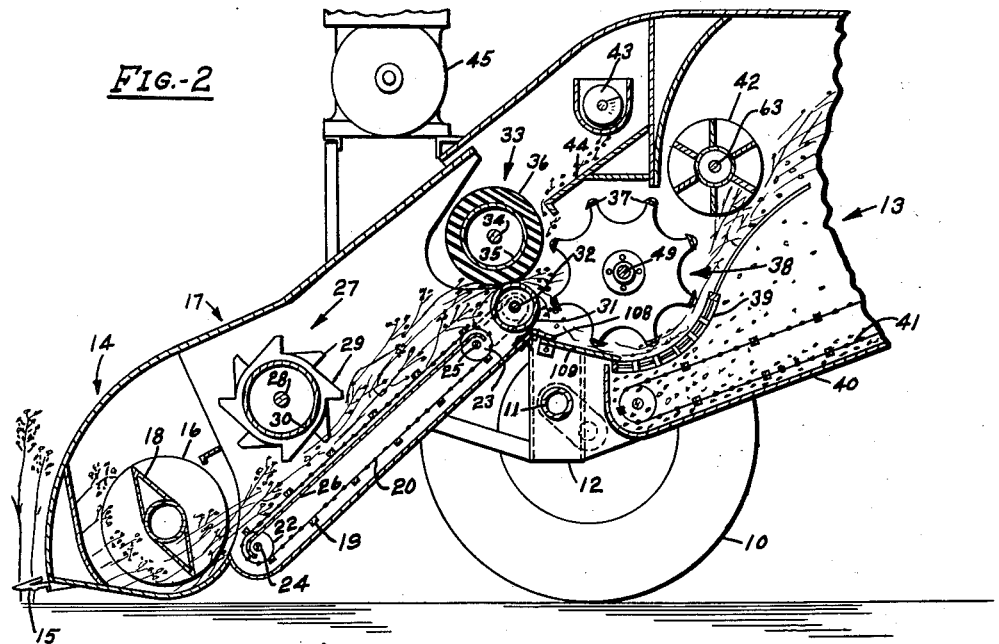
Fig.-2
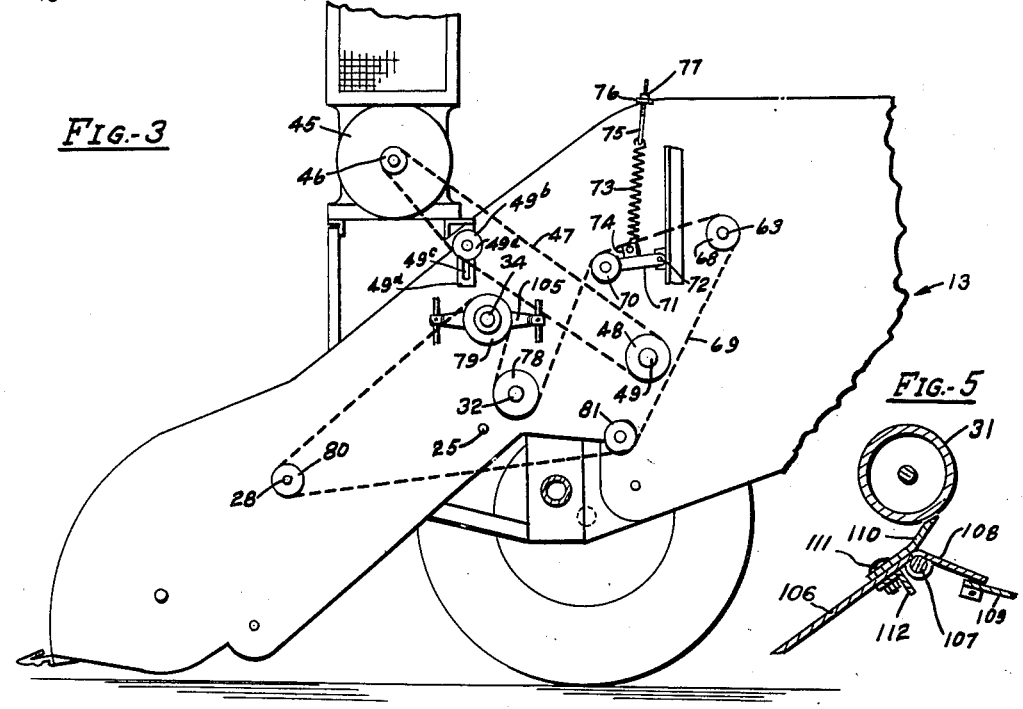
Fig.-3
Fig.-5
INVENTORS
Norman R Krause
Sherman C Heth
BY Emerson B Donnell
ATTORNEY Patented Dec. 11, 1945

2,390,949

UNITED STATES PATENT OFFICE 2,390,949

FEEDING MECHANISM

Norman R. Krause and Sherman C. Heth, Racine, Wis., assignors to J. I. Case Company, Racine, Wis., a corporation Application April 28, 1942, Serial No. 440,874

3 Claims. (Cl. 130—13)

The present invention relates to threshing mechanism or combination harvester threshers, and an object of the invention is to generally improve the construction and operation of machines of this class. More particularly an object of the invention is to improve the feeding mechanism of such a machine.

Specifically the object of the invention is to provide a feeding mechanism for a thresher or combination harvester thresher especially adapted to handle material which is extremely susceptible to tangling, such for example as flax, and which mechanism is interchangeable with the feeding mechanism commonly on the combine with a minimum of rearrangement thereof.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

In the drawings,

Fig. 2 is a sectional view taken on the line 2—2 of Fig. 1.

Fig. 3 is a left side elevation of the machine indicated in Fig. 2.

Fig. 5 is an enlargement of a portion of Fig. 2.

Figure 1:
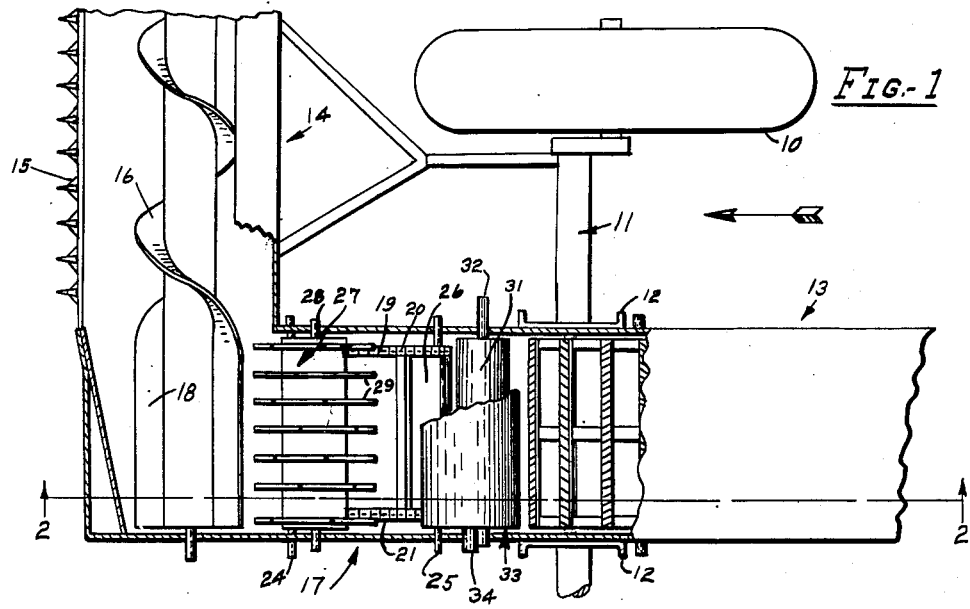
Figure 1 is a plan view of a fragment of a harvester thresher embodying the invention with parts removed and others broken away.

As seen in Fig. 1, the machine illustrative of the invention is carried on a ground wheel or wheels as 10 supporting an axle 11 which carries through appropriate bracing members generally designated as 12, the body portion of a thresher generally designated as 13 and a header generally designated as 14. In the present instance header 14 has a cutter bar 15 and rearwardly thereof an auger conveyor 16 which operates to convey material laterally into a feeder housing 17. Within feeder housing 17 auger 16 becomes a paddle portion 18, and paddle portion 18 operates to discharge material from itself onto an endless conveyor or raddle including slats 19 and chains 20 and 21 extending substantially through feeder house 17. Chain 20 in the present instance travels over sprockets 22 and 23, Fig. 2, carried respectively on shafts 24 and 25. Slats 19 in the disclosed embodiment travel over a deck 26 on which material being conveyed is supported.

With the mechanism so far described, progress of the machine in the direction indicated would result in material being cut by cutter bar 15 and conveyed into feeder house 17 by auger 16, discharged from paddle portion 18 onto slats 19, and elevated thereby over deck 26.

In the present instance a beater generally designated as 27 is mounted on a shaft 28 above deck 26 and comprises a plurality of star shaped disks 29—29, assembled on a tubular or similar core 30. Rotation of beater 27 will accordingly tend to comb the material traveling on deck 26, break it apart, and loosen it into a homogeneous mass or mat which will continue to travel upwardly over deck 26.

Adjacent sprocket 23 a roller 31 is mounted on a shaft 32 in the present instance in the position commonly occupied by shaft 25 when the feeding device of the present invention is not required, and adapted to receive above itself material traveling on deck 26, and above roller 31 a roller 33 is arranged substantially in contact with roller 31 on a shaft 34 so as to receive beneath itself, or between itself and roller 31, the above mentioned material. Roller 33 occupies the position of a beater substantially similar to beater 27, used when the properties of the present invention are not required. The space between rollers 33 and 31 is not sufficient for any appreciable bulk of material and shaft 34 is accordingly mounted in such a manner that roller 33 may rise when material is introduced between it and roller 31 as will appear.

In the present instance roller 31 is of metallic construction and roller 33 comprises a shell 35 or similar core member on which is arranged a coating or facing 36 of yieldable rubber or rubber-like material. The arrangement is such that very substantial pressure is exerted on material passing between rollers 31 and 33 so that material such for example as flax straw is firmly held between rollers 31 and 33 and extends into the path of the threshing elements 37 of a threshing cylinder generally designated as 38. A beating or flailing action is therefore performed on the material while it is firmly held between rollers 33 and 31, most of the grain being thus removed from the heads or pods.

In the case of flax, the pods are ruptured or crushed by the pressure of rollers 31 and 33 so that the grain may be beaten out by threshing elements 37. A concave 39 of any preferred construction cooperates with cylinder 38 but in the present instance, and particularly when threshing flax, may be adjusted to a position giving substantial clearance between itself and cylinder 38. There is thus very little, if any, rubbing action between threshing elements 37 and concave 39 under these conditions and substantially no tendency to crack the relatively brittle flax seeds. Furthermore, the straw runs between the cylinder 38 and concave 39 without being injured.

Practically all of the seeds are removed from the straw at the first contact with threshing elements 37 and they fall through concave 39 to grain pan 40 and are removed by a conveyor generally designated as 41, to the cleaning apparatus of the harvester thresher which may be of any preferred type, not shown.

A beater 42 in the present instance is positioned slightly behind cylinder 38 for arresting any flying material and agitating straw leaving concave 39 and cylinder 38.

A tailings return conveyor 43 is positioned substantially above cylinder 38 and distributes the tailings over a deck 44 which partially encloses cylinder 38.

Figure 4:
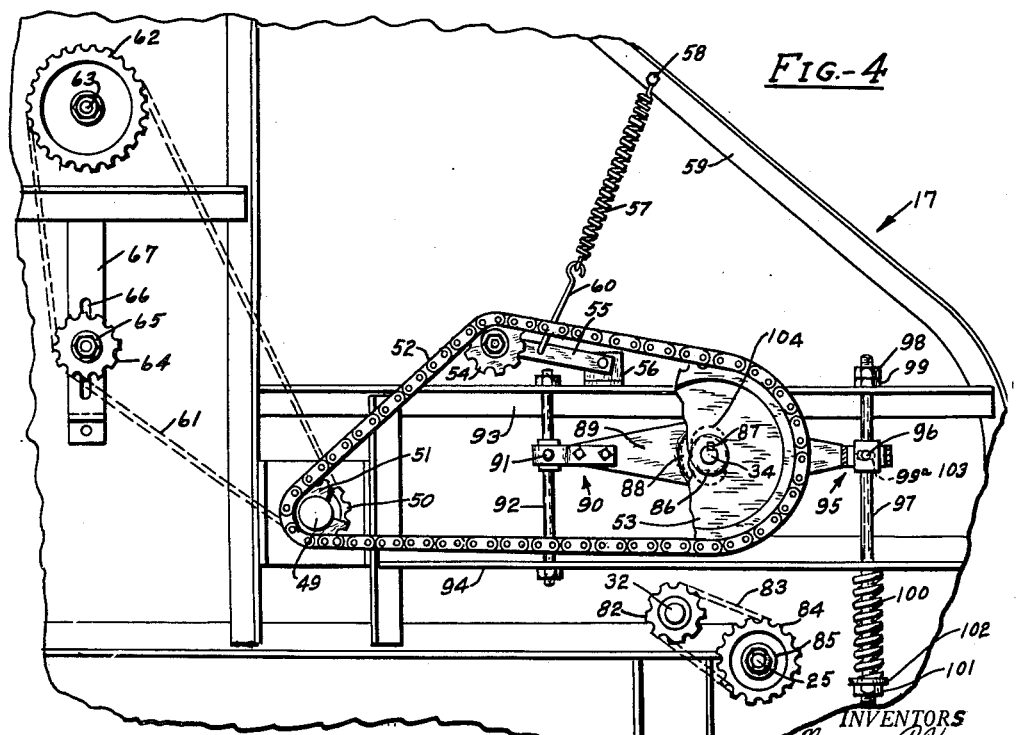
Fig. 4 is an enlarged right side elevation of a fragment of the machine.

Certain phases of the invention relate to the drives for the several elements above noted. Thus as seen in Fig. 3, an engine 45 is mounted in the present instance above feeder house 17 and has a sprocket or the like 46 driving, through a chain 47, a sprocket 48 on a shaft 49 constituting the shaft or axis of cylinder 38. A direct drive is thereby supplied to the shaft which normally requires the most power. An idler 49a journaled on a stud 49b adjustable in a slot 49c in a member 49d is provided for adjusting the tension in chain 47. Cylinder shaft 49 also acts as a countershaft extending through thresher portion 13 as indicated in Fig. 4. Shaft 49 carries a plurality of sprockets 50 and 51. Sprocket 51 drives, through a chain 52, a sprocket 53 fixed on above mentioned shaft 34, being the axis of above mentioned roller 33. Shaft 34 as will be further set forth is yieldably mounted and an idler 54 is journaled on a swinging arm 55 pivoted at 56 to any suitable part of the machine. Arm 55 is urged in an upward direction by means of a spring 57 anchored at 58 to a frame member 59 of feeder house 17 and communicating its pull to arm 55 through a pull rod 60.

Sprocket 50 drives, through a chain 61, sprocket 62 on a shaft 63, being the main shaft or axis of beater 42. An idler sprocket 64 is journaled on a stud or the like 65 adjustable in a slot 66 in a strap or similar member 67 to maintain the desired degree of tightness in chain 61.

Shaft 63 as indicated in Figs. 2 and 3 extends through body portion 13 and has a sprocket 68 actuating a chain 69. Chain 69 passes over an idler sprocket 70 journaled on an arm 71 pivoted at 72 to any suitable part of the machine and urged upwardly by a spring 73 connected at 74 with said arm and anchored by a bolt 75 to a frame member 76, a nut 77 engaging member 76 for adjusting bolt 75 and accordingly the degree of tension in spring 73. Chain 69 passes beneath a sprocket 78 on above mentioned shaft 32, being the axis of above mentioned roller 31 and through which roller 31 is driven. This sprocket or a corresponding one is fixed on and drives shaft 25 under conditions where roller 31 is not used. The sizes of the various sprockets are so chosen that the surfaces of rollers 31 and 33 will have corresponding rates of motion. Chain 69 also passes above a sprocket 79 journaled on above mentioned shaft 34 and then about a sprocket 80 on above mentioned beater shaft 28. Sprocket 79 or a corresponding one drives the beater above referred to, which occupies the position of roller 33 when the latter is not used. Chain 69 then passes beneath an idler sprocket 81 whence it returns to sprocket 68. Cylinder 38, beater 42, roller 33, roller 31 and beater 28 are accordingly driven from engine 45 as will be apparent.

Returning to Fig. 4, above mentioned shaft 32 has a sprocket 82 driving, through a chain 83, a sprocket 84 journaled on above mentioned shaft 25. Sprocket 84 drives shaft 25 through a safety or "jump" clutch generally designated as 85 of suitable or well-known form. In this manner conveyor shaft 25 is driven, but in the event that the machine clogs or conveyor 20 is blocked for any other reason, safety jump clutch 85 will slip and avoid damage to the mechanism.

The other elements of the machine, such for example as conveyors 16 and 41, and tailings conveyor 43, are all driven from engine 45 in suitable or well-known manner not necessary to describe further.

Roller shaft 34 is yieldably mounted, as above suggested, in the following manner. As seen in Fig. 4, sprocket 53 is suitably fixed on shaft 34 as by a hub 86 having a key 87. Shaft 34 is journaled in a bearing 88 carried in a lever 89. Lever 89 is disposed outside of feeder house 17 and is preferably although not necessarily bifurcated at 90 to engage trunnions as 91 carried by a strut 92, extended between frame members 93 and 94.

Member 89 is also bifurcated at 95 and pivotally engaged with trunnions as 96 on a tension rod 97 slidably arranged in frame members 93 and 94 and having adjusting nuts 98 and 99, in the present instance above member 93. Lever 89 is given sufficient freedom relatively to rods 92 and 97 to allow for its slight arcuate movement about trunnion 91, in the present instance by means of a slot 99a in bifurcated portion 95. Beneath frame member 94 a spring 100 is arranged about rod 97 and compressed between member 94 and an adjusting nut 101, a washer 102 being interposed if desired. Downward pressure of spring 100 exerts a downward pull on rod 97 and accordingly on bifurcated portion 95 of lever member 89. This pull is opposed in the present instance by contact of nut 99 with frame member 93 and nut 99 may be adjusted to positively locate the position of bearing 88 and accordingly shaft 34.

The covering 103 of feeder housing 17 is slotted at 104 to provide for up-and-down movement of shaft 34.

A substantially identical arrangement of a lever 105, Fig. 3, is arranged at the opposite end of shaft 34, so that roller 33 may be pressed down with substantially equal force at both ends. Since the construction is substantially the same, no further description thereof is deemed necessary. In operation, lock nut 99 is adjusted to provide a desired clearance between roller 33 and roller 31 regardless of the downward pull of rod 97. This condition obtains when no material is passing through the machine. As soon as material passes between rollers 31 and 33, upward force is developed which may further compress spring 100 by raising shaft 34. The degree of pressure necessary to raise shaft 34 may be adjusted by changing the position of nut 101, and normally spring 100 is compressed somewhat in addition to its initial degree of compression whenever material is passing between rollers 31 and 33, so that, as a practical matter, the adjustment of spring 100 by nut 101 determines the degree of pressure on the material being threshed, while nuts 99 and 98 serve to prevent contact between rollers 31 and 33, and any deleterious effect on roller 33 when the machine is empty.

It is possible to so adjust nut 99 that roller 33 will have an initial pressure against roller 31 if required under certain conditions and this may be anything from clearance as above suggested to the full pressure necessary to compress spring 100.

It is noted that any pressure in spring 100 is multiplied by the effect of lever 89 in its application to shaft 34.

Under certain conditions, notably when dealing with flax, there has been difficulty from building up of sticky green material on roller 31. In the present instance, feeder housing 17 has a main floor 106 terminating at its upper extremity in a hinge portion 107 to which is connected a closure plate 108. Closure plate 108 avoids any gap between feeder house 17 and a plate 109 leading to concave 39. As is common in machines of this type, feeder house 17 swings about shaft 32 as a pivot for raising and lowering cutter bar 15. This entails appreciable movement in the neighborhood of closure plate 108. Closure plate 108, however, may swing about hinge 107 to prevent any opening at this point caused by movement of feeder house 17.

A scraper plate 110 is fixed with main floor 106 in the present instance slightly below hinge portion 107 and is pressed by its own resiliency or other means into contact with roller 31, in the present instance on the under side thereof. Plate 110 is held in position by bolts as 111 in the present instance passing through plate 106 and engaged with a reinforcing member 112. Plate 110 and reinforcing member 112 are normally applied to the machine whenever roller 31 is attached and under conditions where the facilities of this invention are not required these parts are omitted.

It will be understood that while the parts of the invention have been described in some detail, the description is merely illustrative and not restrictive. For example, where the terms sprockets and chains are used, it is to be understood that belts and pulleys or other motion transmitting devices are contemplated. Furthermore, fastening devices such as bolts, rivets, etc., have not been shown in detail in the interests of avoiding complication in the drawings, but it is understood that fastening devices are intended wherever necessary and that parts described as fastened together or fixed to each other have suitable or well-known fastening means for accomplishing such purposes.

The above being a complete description of an illustrative embodiment of the invention, what is claimed as new and desired to be secured by Letters Patent in the United States is:

1. In a feeding mechanism for flax and the like, the combination of an endless conveyor, a star wheel beater above said endless conveyor, and so positioned relatively thereto as to loosen and untangle material traveling on said endless conveyor, a smooth surfaced hard pressure roller in position to receive material from said endless conveyor, and a second pressure roller having a comparatively soft yielding surface, pressed against the first mentioned roller, so as to form a bite substantially in line with said endless conveyor, a threshing cylinder, and said bite being positioned to receive material directly from said endless conveyor, and to hold said material and advance it into position to be flailed by said cylinder while held by said pressure rollers.

2. In a feeding mechanism for flax and the like, the combination of an endless conveyor, a star wheel beater above said endless conveyor, and so positioned relatively thereto as to loosen and untangle material traveling on said endless conveyor, a smooth surfaced hard pressure roller spaced from the beater on the down stream side of the conveyor in position to receive material from said endless conveyor, and a second pressure roller having a comparatively soft yielding surface, pressed against the first mentioned roller, so as to form a bite substantially in line with said endless conveyor, a threshing cylinder, and said bite being positioned to receive material directly from said endless conveyor, and to hold said material and advance it into position to be flailed by said cylinder while held by said pressure rollers.

3. In a feeding mechanism for flax and the like, the combination of an endless conveyor, a relatively rapidly rotating star wheel beater above said endless conveyor, and so positioned relatively thereto as to loosen and untangle material traveling on said endless conveyor, a smooth surfaced hard pressure roller spaced from the beater on the down stream side of the conveyor in position to receive material from said endless conveyor, and a second pressure roller having a comparatively soft yielding surface, pressed against the first mentioned roller, so as to form a bite substantially in line with said endless conveyor, a threshing cylinder, and said bite being positioned to receive material directly from said endless conveyor, and to hold said material and advance it into position to be flailed by said cylinder while held by said pressure rollers.

NORMAN R. KRAUSE.
SHERMAN C. HETH.